(12) United States Patent
Elsaadani et al.

(10) Patent No.: US 10,649,164 B1
(45) Date of Patent: May 12, 2020

(54) OPTICAL FIBER AND POWER TRANSITION DESIGN

(71) Applicant: NOKIA SHANGHAI BELL CO., LTD., Shanghai (CN)

(72) Inventors: Asaad Elsaadani, Meriden, CT (US); Andrei Vankov, Canaan, NY (US)

(73) Assignee: NOKIA SHANGHAI BELL CO., LTD., Shanghai (CN)

( * ) Notice: Subject to any disclaimer, the term of this patent is extended or adjusted under 35 U.S.C. 154(b) by 0 days.

(21) Appl. No.: 16/446,216

(22) Filed: Jun. 19, 2019

(51) Int. Cl.
*G02B 6/44* (2006.01)
*G02B 6/38* (2006.01)

(52) U.S. Cl.
CPC .......... *G02B 6/4416* (2013.01); *G02B 6/3846* (2013.01); *G02B 6/3885* (2013.01)

(58) Field of Classification Search
CPC .... G02B 6/4416; G02B 6/443; G02B 6/3817; G02B 6/4494; G02B 6/44; H01B 11/22
See application file for complete search history.

(56) References Cited

U.S. PATENT DOCUMENTS

| | | | |
|---|---|---|---|
| 6,764,221 B1 | 7/2004 | de Jong et al. | |
| 8,038,356 B2* | 10/2011 | Marcouiller | G02B 6/3869 385/76 |
| 8,342,755 B2* | 1/2013 | Nhep | G02B 6/3887 385/78 |
| 9,869,822 B2 | 1/2018 | Islam | |
| 10,209,475 B2 | 2/2019 | Wang | |
| 2015/0168657 A1 | 6/2015 | Islam | |

FOREIGN PATENT DOCUMENTS

| | | |
|---|---|---|
| AU | 2015288583 B2 | 1/2016 |
| DE | 100 08 613 A1 | 9/2001 |
| EP | 2 619 617 B1 | 12/2016 |
| KR | 10-2012-0125821 A | 11/2012 |

OTHER PUBLICATIONS

Rosenberger, "Hybrid Solutions: The New Generation of Fiber-to-the-Antenna CAbling", https://www.panosing.com/wp-content/uploads/katalozi/Kablovi/Hibridni/Hybrid+Solutions_(1).pdf.
Mary Gannon, "Hybrid FTTA-PTTA optical cable solutions from Molex help reduce space", https://www.wireandcabletips.com/hybrid-ftta-ptta-optical-cable-solutions-from-molex-help-reduce-space/.

\* cited by examiner

*Primary Examiner* — Jennifer Doan
(74) *Attorney, Agent, or Firm* — Squire Patton Boggs (US) LLP

(57) ABSTRACT

According to an embodiment, an apparatus comprises a fiber-breakout transition configured to break out optical fiber sets from a first end of an optical fiber cable. The fiber-breakout transition comprises a first channel configured to receive an end segment of the optical fiber cable. The fiber-breakout transition further comprises a plurality of second channels. Each of the plurality of second channels is configured to receive and mechanically attach a buildup tube for holding one or more optical fibers. The transition has an interior cavity connecting the first channel to the plurality of second channels. Some of the channels have cross-sections whose diameters increase in a stepped manner with distance away from the interior cavity of the transition.

19 Claims, 9 Drawing Sheets

OPTICAL FIBER AND POWER TRANSITION DESIGN

BACKGROUND

Field

This disclosure relates generally to optical fiber cables, optical fiber and power cables, and for devices for use with such cables.

Description of the Related Art

This section introduces aspects that may be helpful to facilitating an understanding of various embodiments of the invention. Accordingly, the statements of this section are to be read in this light, and are not to be understood as admissions about what is prior art or what is not prior art.

Remote radio heads (RRHs) extend the range of wireless networks into areas that may present challenges for deploying traditional wireless equipment. For example, RRHs may be deployed in rural regions where base station hardware may be difficult to install and/or access, thereby filling gaps in network coverage. RRHs may connect to a core network, such as a baseband unit (BBU), through a wired or wireless connection, and may have capabilities for converting between analog and digital signals.

SUMMARY

In accordance with some embodiments, an apparatus may comprise a fiber-breakout transition configured to break out optical fiber sets from a first end of an optical fiber cable. The fiber-breakout transition comprises a first channel configured to receive an end segment of the optical fiber cable and a plurality of second channels, where each of the plurality of second channels is configured to receive and mechanically attach to a buildup tube for holding one or more optical fibers. The transition has an interior cavity connecting the first channel to the plurality of second channels. Some of the channels have cross-sections whose diameters increase in a stepped manner with distance away from the interior cavity of the transition.

In a variant, the fiber-breakout transition may further comprise a plurality of buildup tubes, where each of the buildup tubes may comprise a segment mechanically fixed into one of the second channels, and at least two of the buildup tubes may have a different outer diameter.

In a variant, the fiber-breakout transition may further comprise a plurality of optical fibers comprising at least one segment slidably disposed in one or more of the buildup tubes.

In a variant, the fiber-breakout transition may further comprise a window configured to enable external viewing of at least one portion of the interior cavity.

In a variant, the fiber-breakout transition may further comprise one or more anti-sliding fibers, wherein each anti-sliding fiber may comprise a segment disposed between a particular one of the buildup tubes and the particular one of the second channels in which part of the particular one of the buildup tubes is located.

In a variant, the fiber-breakout transition may further comprise adhesive connecting the one or more anti-sliding fibers with at least one second channel.

In a variant, the first channel may comprise at least one cross-section whose diameter increases in a stepped manner with distance away from an interior cavity of the transition.

In a variant, the fiber-breakout transition may further comprise at least one cable configured to house a plurality of optical fibers, the at least one cable comprising an end segment mechanically fixed in the first channel.

In a variant, the fiber-breakout transition may further comprise a hybrid cable, the hybrid cable comprising segments of one or more electrical conductor cables and a segment of the optical fiber cable.

In a variant, the fiber-breakout transition may comprise a window enabling external viewing of at least a portion of the interior cavity.

In a variant, the plurality of buildup tubes may be furcation tubes.

In accordance with some embodiments, an apparatus may comprise a cable-breakout transition for a hybrid optical cable comprising at least one optical fiber cable and at least one electrical conductor cable. The cable-breakout transition may comprise a molded housing comprising a first end and a second end. The molded housing may comprise at least one channel through the molded housing from a first end of the molded housing to a second end of the molded housing. The at least one channel may be configured to mechanically hold at least one electrical conductor cable. The molded housing may further comprise at least one slot along a lateral surface of the molded housing from the first end of the molded housing to the second end of the molded housing. The at least one slot may be configured to mechanically hold at least one optical fiber cable. The molded housing may further comprise at least one sheath disposed around the housing. The first end of the housing may be configured to slide into or around an end segment of the hybrid optical cable.

In a variant, the first and second ends may comprise different diameters.

In a variant, the hybrid optical cable may comprise at least one electrical conductor cable having at least one segment in the at least one of the channels, and at least one optical cable having a segment in the at least one of the slots.

In a variant, the molded housing may further comprise at least one circumferential indentation on a lateral surface of the molded housing.

In a variant, the apparatus may further comprise at least one strain relief hold, wherein the hybrid cable includes at least two electrical conductor cables having a segment in the at least one strain relief.

In a variant, the molded housing may comprise a cylindrical housing.

In a variant, the at least one passage may comprise a cylindrical passage.

BRIEF DESCRIPTION OF THE DRAWINGS

Various embodiments are illustrated by the accompanying drawings, wherein.

DETAILED DESCRIPTION

Figure 1:
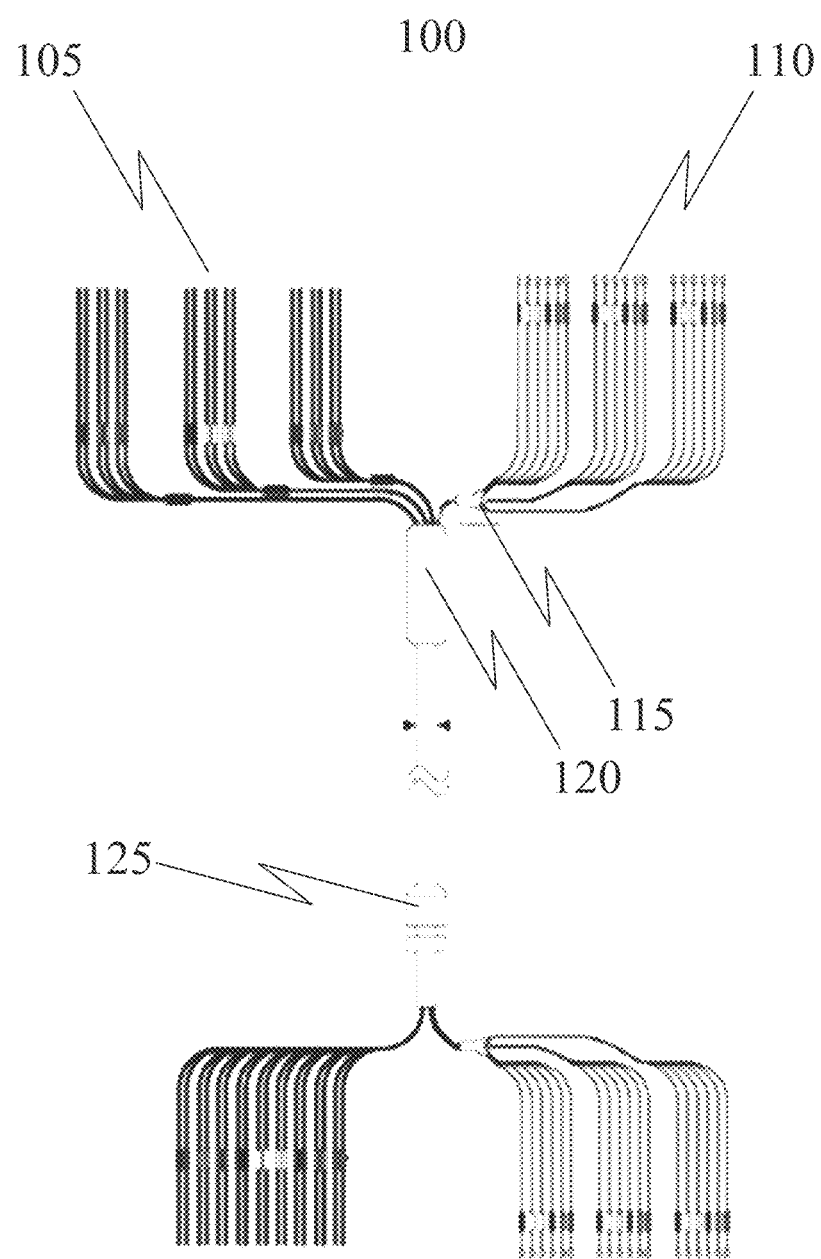
FIG. 1 is a top view illustrating an embodiment of a hybrid cable having separated electrical cables and optical fiber cables at ends thereof.

RRHs may be connected to base station hardware using a combination of optical fiber and DC power cables. Rather than deploying two separate lines, hybrid feeder cables combine optical fiber and power lines into a single cable, for example, a cable having a metal corrugated sheath. The use of such a hybrid cable may reduce installation complexity and costs, such as during the installation of a RRH or other remote electro-optical device. Such solutions, as illustrated in FIG. 1, may also enable mobile operators deploying RRH architecture to standardize the RRH installation process. These hybrid feeder cabling solutions may include multi-mode and/or single-mode optical fibers. In various embodiments, such cables may allow for the connection of remote devices, such as RRHs, via a single hybrid cable. However, since multiple remote electro-optical devices, e.g., different types of RRHs, may be served by a single hybrid cable, it is desirable to have hybrid cables from which multiple sets of fibers may be stably separated via a fiber-breakout transition. In addition, it is desirable that the fiber-breakout transition not unduly restrict the size of optical fibers or buildup tubes that may be inserted therein to stably hold the separated sets of optical fibers.

Furthermore, some traditional hybrid cables use adhesives to join breakout buildup tubes to multiple optical fiber cables within a transition. For example, a buildup tube may fix a segment of the optical fiber of a set being separated out of the optical fiber cable using adhesive. Such adhesives physically constrain movement of the fragile optical fibers, which may cause damage during manufacture of devices with the cables. In addition, such adhesive may also require a significant amount of time to cure once applied to the optical fibers and/or breakout buildup tubes.

Certain embodiments described herein may have various benefits and/or advantages to overcome at least the disadvantages described above. For example, certain embodiments may not use adhesives to attach buildup tubes to breakout transitions of a multi-fiber cable. With the absence of such adhesives, optical fibers and/or buildup tubes may be configured to slide slightly during handling so that damage to the fragile optical fibers is less likely during installation. Such breakout transitions may have a transparent window so that a visual inspection of optical fibers in the fiber-breakout transition is possible, allowing for detection of fiber breaks.

As noted above, FIG. 1 illustrates an example of a hybrid cable 100 having separated electrical cables and optical fiber cables at each end, according to an embodiment. For example, the hybrid cable 100 may have at least one pair of DC conductors 105, which, for example, may have shrink caps on the outer end. The hybrid cable 100 may also have at least one optical fiber pair 110, which may be terminated with at least one outdoor connector (ODC) plug, and/or may be protected with a weatherproof cap. Additionally, the hybrid cable 100 may have at least one fiber-breakout transition 115, further described in FIGS. 3 and 4, as well as at least one cable-breakout transition 120, which is further described in FIGS. 5 through 8. Finally, the hybrid cable 100 may further have at least one bulkhead fitting 125.

Figure 2:
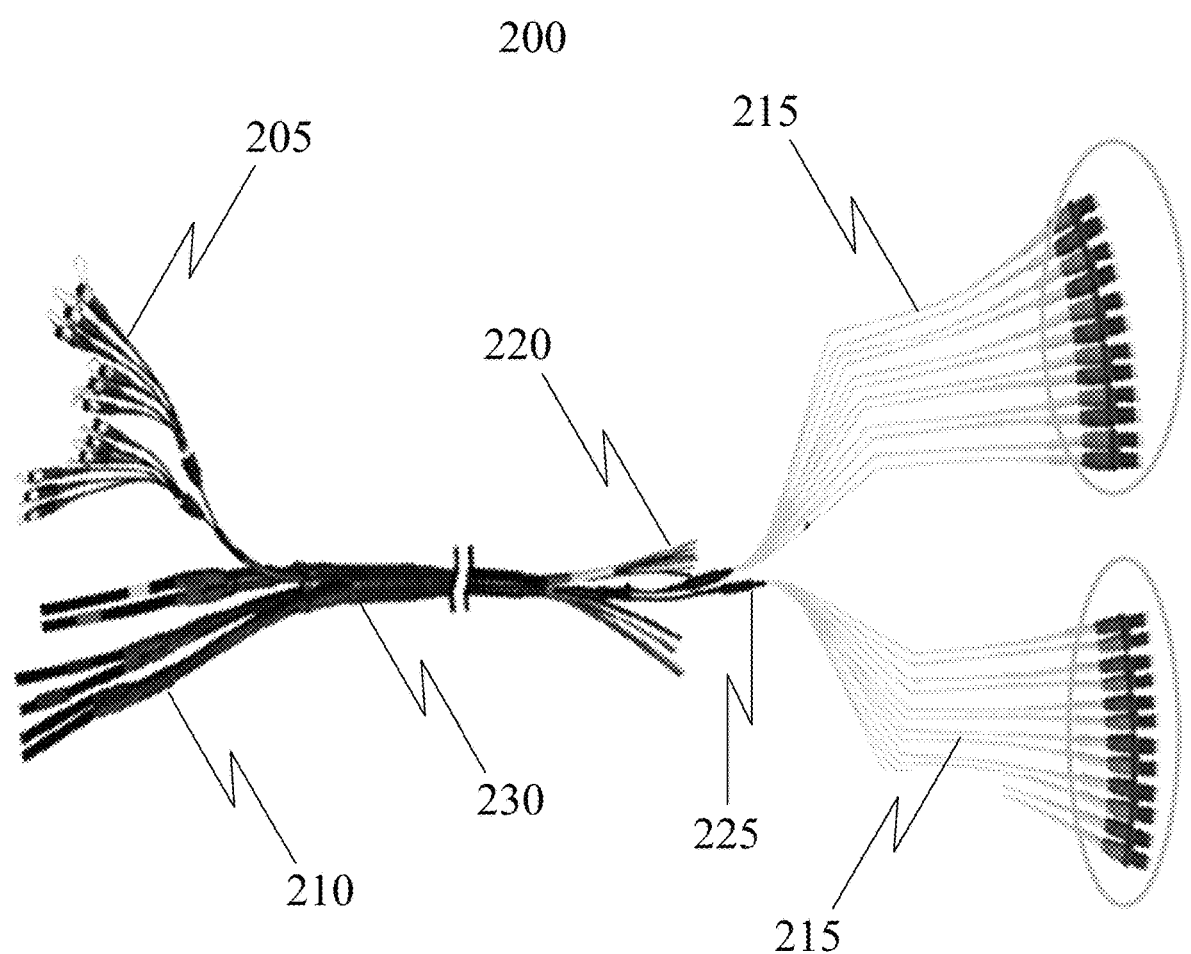
FIG. 2 illustrates another example of an optical fiber cable assembly.

FIG. 2 provides another example of an assembly, according to some embodiments. In the example of FIG. 2, optical fiber cable assembly 200 is shown with optical fiber cables 205 and power cables 210 on one end, which may connect with at least one RRH. The other end of the optical fiber cable assembly 200, which may be configured to connect with at least one BBU, includes optical fiber cables 215, which may include an LC termination. The other end of the optical fiber cable assembly 200 may also include power cables 220, which may be color-coded, shielded power wire conductors. At least one optical fiber cable 215 may be in connection with fiber-breakout transition 225, which may be similar to fiber-breakout transition 115 in FIG. 1. Finally, between the two ends of the optical fiber cable assembly 200 may be cable-breakout transition 230, which may be similar to cable-breakout transition 120 in FIG. 1.

Figure 3:
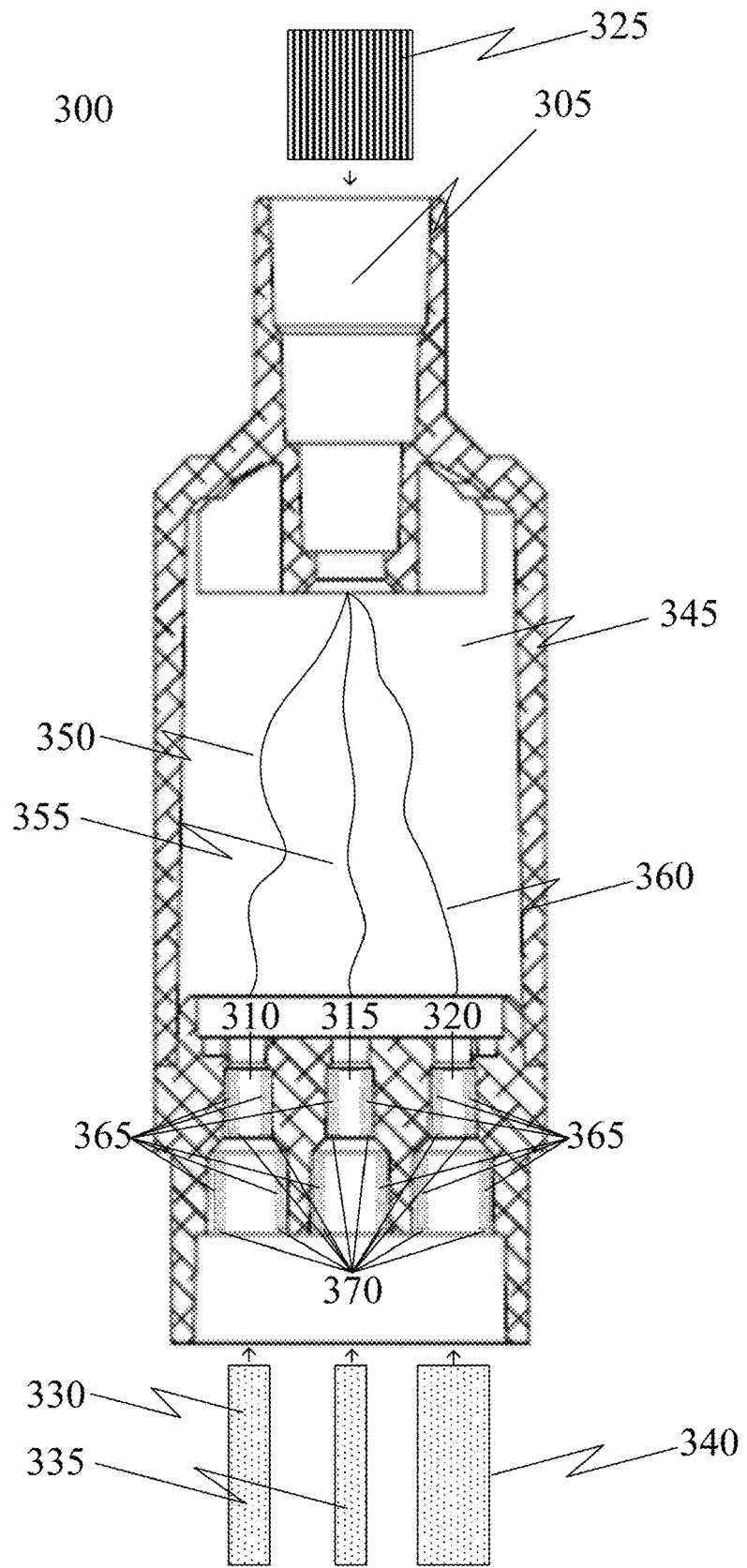
FIG. 3 is a cross-sectional view of an example of a fiber-breakout transition for an optical fiber cable, such as one of the optical fiber cables illustrated in FIG. 1.
Figure 4:
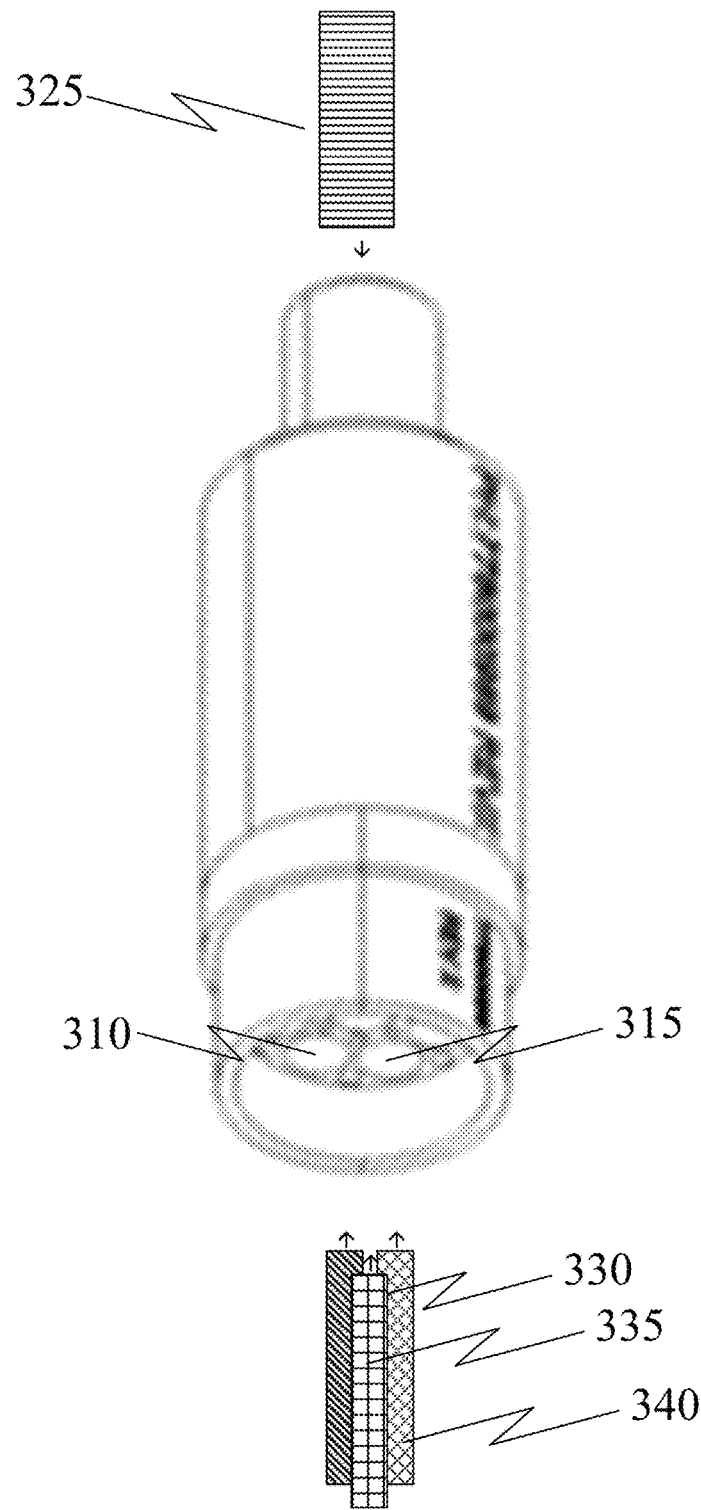
FIG. 4 is an oblique view of an example of the fiber-breakout transition illustrated in FIG. 3.

FIG. 3 illustrates an example of a fiber-breakout transition 300 for breaking out separate sets of optical fibers from an optical cable having multiple optical fibers therein, according to some embodiments. FIG. 4 illustrates an oblique view of fiber-breakout transition 300. The fiber-breakout transition 300 comprises a first channel 305 and a plurality of second channels, such as second channels 310, 315, 320. The first channel 305 is constructed to mechanically hold an end segment of the optical fiber cable 325 therein. For example, one or more anti-sliding fibers may be squeezed between the inner wall of the first channel 305 and the end segment of the optical fiber cable 325 to mechanically fix the optical fiber cable 325 in the fiber-breakout transition 300.

Similarly, each second channel 310, 315, 320 may be configured to mechanically hold a buildup tube 330, 335, 340 therein. Each buildup tube 330, 335, 340 may rigidly hold segments of a corresponding set of optical fibers being separated at the fiber-breakout transition 300. For example, one or more anti-sliding fibers may be squeezed between the walls of one or more of the second channels 310, 315, 320 and one or more of the buildup tubes 330, 335, 340 to mechanically fix the buildup tubes 330, 335, 340 in the fiber-breakout transition 300. In some embodiments, buildup tubes 330, 335, 340 may be furcation tubes, including commercial furcation tubes.

While FIGS. 3 and 4 illustrate the fiber-breakout transition 300, the first channel 305, and the plurality of second channels 310, 315, 320 as having a cylindrical external shape, other embodiments may have other external shapes, such as a triangular prism, rectangular prism, pentagonal prism, rectangular cuboid, and rectangular parallelepiped. However, any shape may be used.

In various embodiments, the first channel 305 and/or one or more of the second channels 310, 315, 320 may comprise at least one diameter, which may be approximately stepped along the axis of at least one of channels 305, 310, 315, 320. For example, the stepping of the diameter of at least one of the channels 305, 310, 315, 320 may have larger diameters away from the external surface of the fiber-breakout transition 300. At least one of the channels 305, 310, 315, 320 may comprise at least one circular cross-section to form at least one stepped cylindrical structure. For example, at least one stepped cylindrical structure may comprise two or more cylindrical portions of different diameters. The at least one cylindrical structure may increase in diameter away from the interior of the fiber-breakout transition 300.

In some embodiments, the stepped diameters of the first channel 305 and/or second channels 310, 315, 320 may enable at least one object of different diameter to be mechanically fixed therein, allowing for easy assembly and limiting sliding of pieces of the final assembly. For example, the stepped diameter of the first channel 305 may enable a snug fit of end segments of optical fiber cable 325 of different diameter. Additionally or alternatively, the stepped diameter of the second channels 310, 315, 320 may enable a snug fit of the buildup tubes 330, 335, 340 for separated sets of optical fiber cables, wherein the buildup tubes 330, 335, 340 may also have different diameters.

The buildup tubes 330, 335, 340 may be fixed to allow, at most, small sliding thereof in the second channels 310, 315, 320. The ability to undergo a small amount of sliding may be useful to compensate for tensile forces on fragile optical fibers during installation thereby reducing the risk of optical fiber breakage. Furthermore, buildup tubes 330, 335, 340 may be fixed to allow at least one optical fiber to slide freely or with a maximum threshold of sliding within buildup tubes 330, 335, 340.

In various embodiments, all or a portion of the exterior wall of the fiber-breakout transition 300 may be transparent or translucent to enable external viewing of segments of optical fibers therein. For example, such external viewing may enable visible inspection said optical fibers for breakage caused by installation.

Fiber-breakout transition 300 may further comprise an inner cavity 345 connecting the first channel 305 to the second channels 310, 315, 320. The inner cavity 345 may comprise at least one segments of optical fiber 350, 355, 360, which may extend between an end of the optical fiber cable 325 and one or more of the second channels 310, 315, 320.

In some embodiments, anti-sliding fibers 365 may be applied to stop or reduce relative sliding of nearby surfaces. The anti-slip fibers 365 may be para-aramid and/or meta-aramid fibers, and/or may be commercially available. For example, anti-slip fibers 365 may be comprised of Nomex™, Kevlar™ Technora™, Twaron™, Vectran™, or any mixture of these anti-slip fibers. Anti-sliding fibers 365 may be applied to the interior walls of any of first channel and the plurality of second channels. Adhesive 370 may be configured to connect anti-sliding fibers 365 with fiber-breakout transition 300 and/or buildup tubes 330, 335, 340. Adhesive 370 may be silicone, urethane, epoxy, or any combination of these or other adhesives, and may be disposed so as to provide a distance between adhesive 370 and optical fiber 350, 355, 360. Adhesive 370 may also be a sealant between fiber-breakout transition 300 and/or buildup tubes 330, 335, 340, such as a liquid and/or gas sealant.

Figure 5:
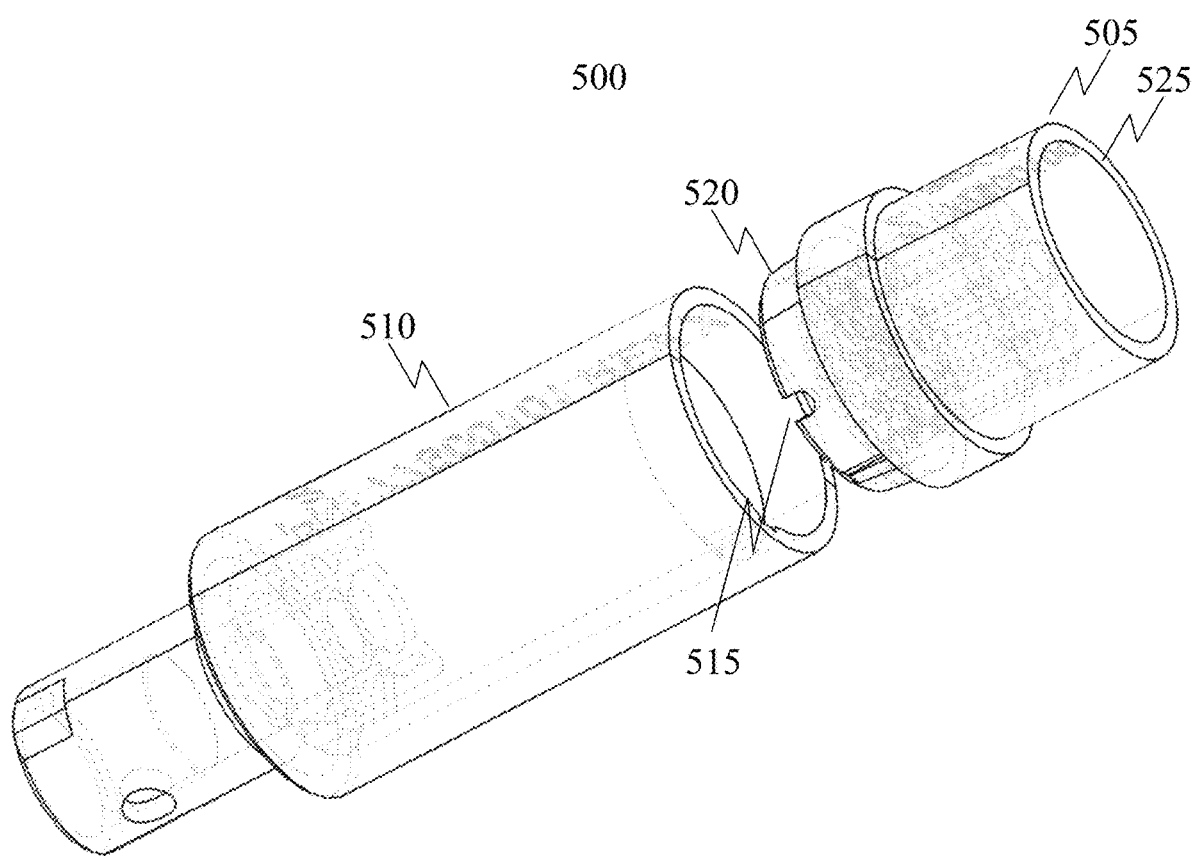
FIG. 5 illustrates a view of an example of a cable-breakout transition according to some embodiments.
Figure 6:
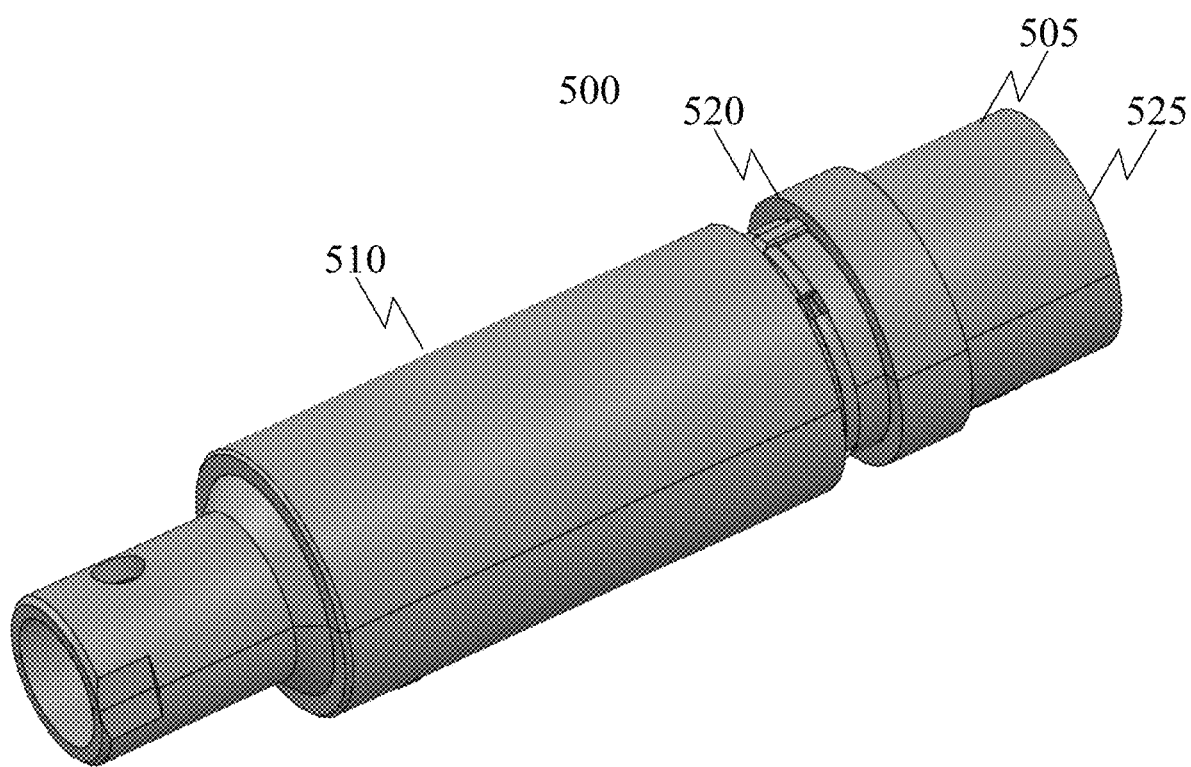
FIG. 6 illustrates another view of an example of a cable-breakout transition according to some embodiments.

FIGS. 5 and 6 illustrate detailed views of an example of a cable-breakout transition 500 according to some embodiments. As shown in FIG. 5, molded housing 505 may be configured to attach with hybrid optical cable 510. For example, lock notch 515 disposed on first end 520 of molded housing 505 may be configured to lock into hybrid optical cable 510 and hold molded housing 505 in place with hybrid optical cable 510, such as by sliding into or around an end segment of hybrid optical cable 510, as illustrated in FIG. 6.

Figure 7:
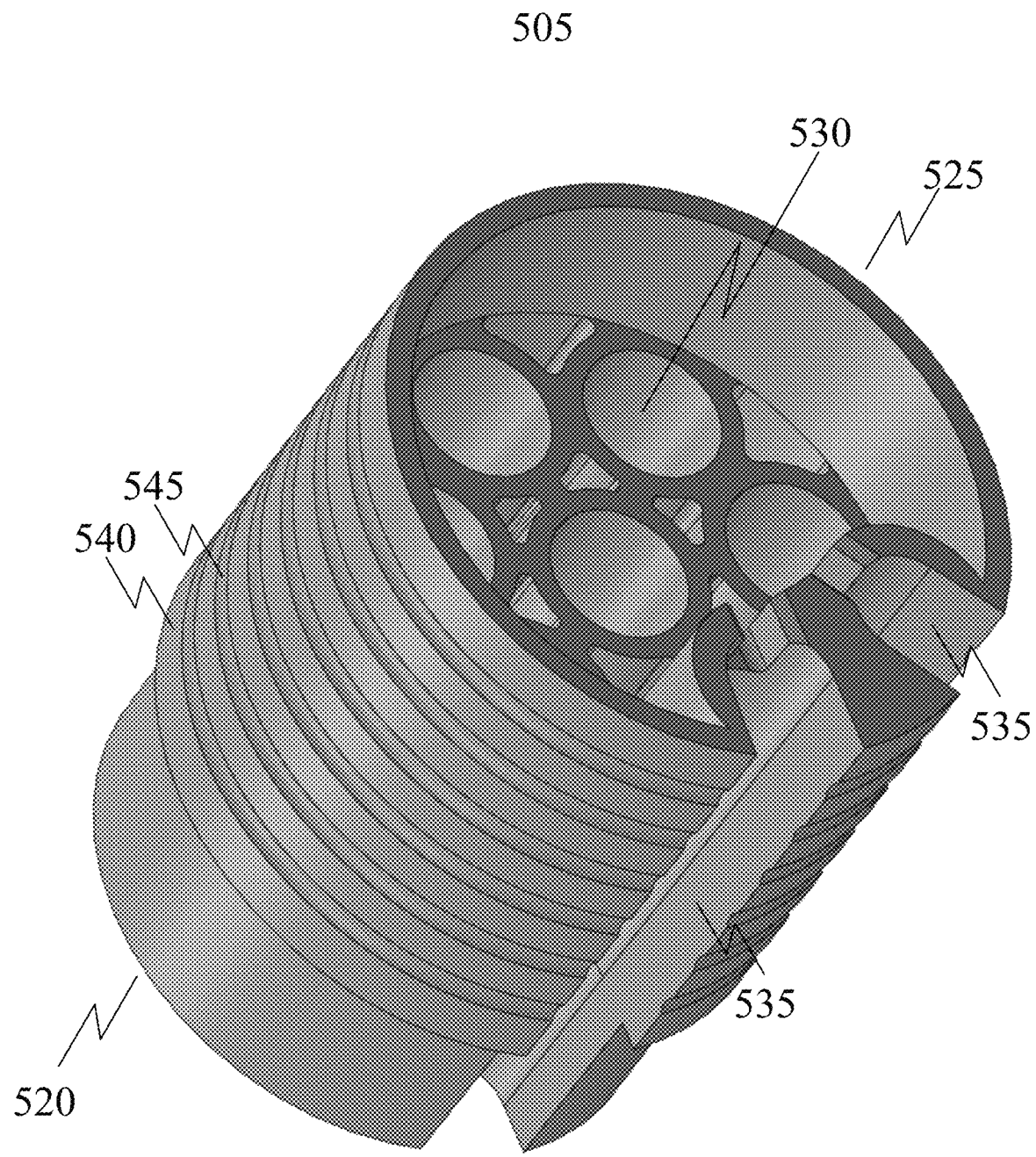
FIG. 7 illustrates a view of an example of a molded housing according to some embodiments.
Figure 8:
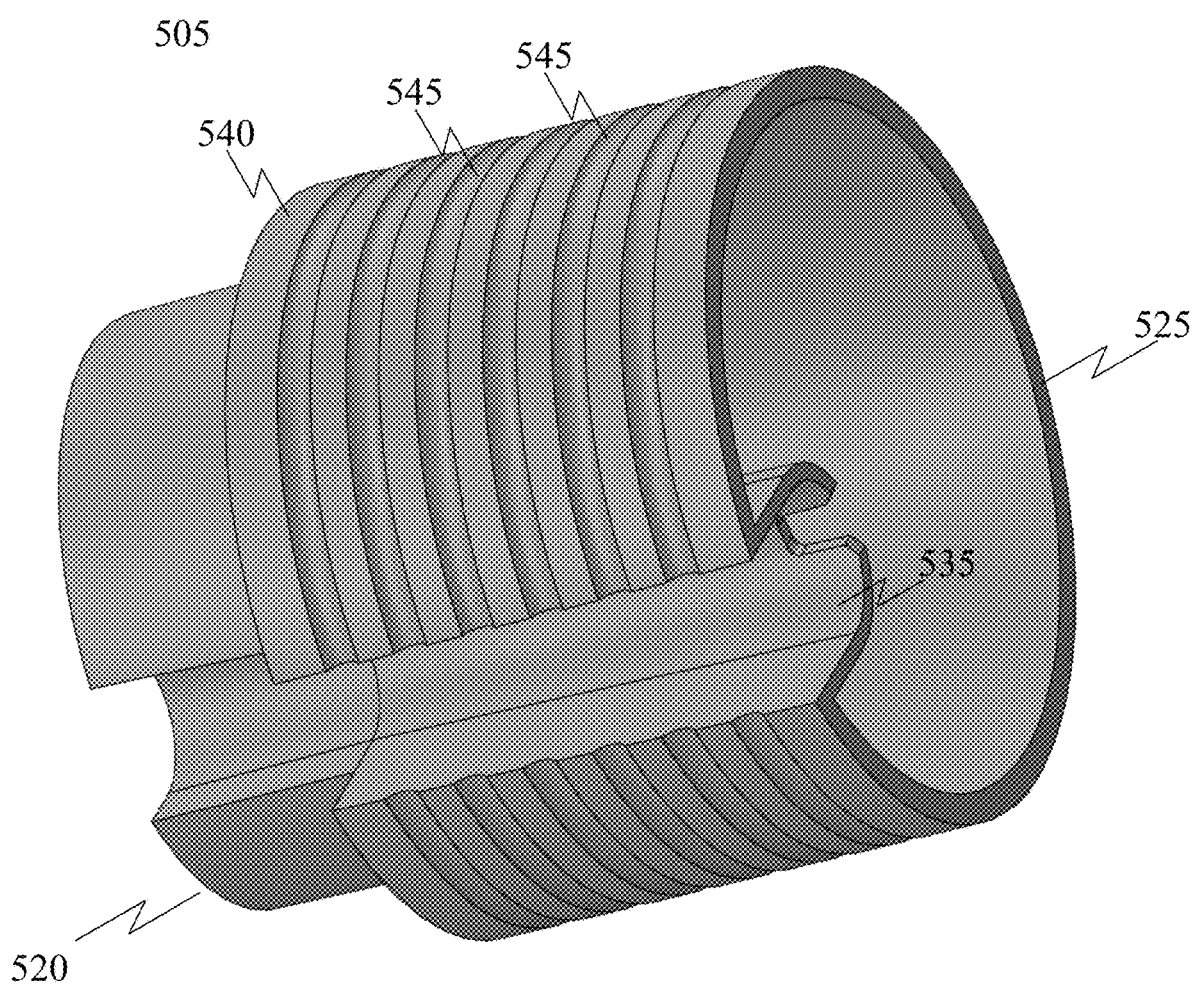
FIG. 8 illustrates another view of an example of a molded housing according to some embodiments.

Molded housing 505 may comprise the first end 520 and a second end 525, as illustrated in FIGS. 7 and 8. While FIG. 7 illustrates the molded housing 505 as a cylindrical casing of a hybrid cable, some embodiments may feature a hybrid cable casing of other shapes, such as a triangular prism, rectangular prism, pentagonal prism, rectangular cuboid, and rectangular parallelepiped. However, molded housing 505 may be any three-dimensional shape. Molded housing 505 may further comprise at least one channel 530 through molded housing 505 from first end 520 to second end 525. Furthermore, first end 520 and second end 525 may comprise different diameters.

The at least one channel 530 may be configured to mechanically hold at least one electrical conductor cable, such as an alternating or direct current power cable. Molded housing 505 may further comprise at least one slot 535 along a lateral surface 540 of the molded housing 505 from first end 520 to second end 525. At least one slot 535 may be configured to mechanically hold at least one optical fiber cable. In some embodiment, a sheath (not displayed) may be disposed around molded housing 505. Molded housing 505 may further comprise at least one circumferential indentation 545 on a lateral surface 540. The at least one circumferential indentation may be curved or may be angled.

Figure 9:
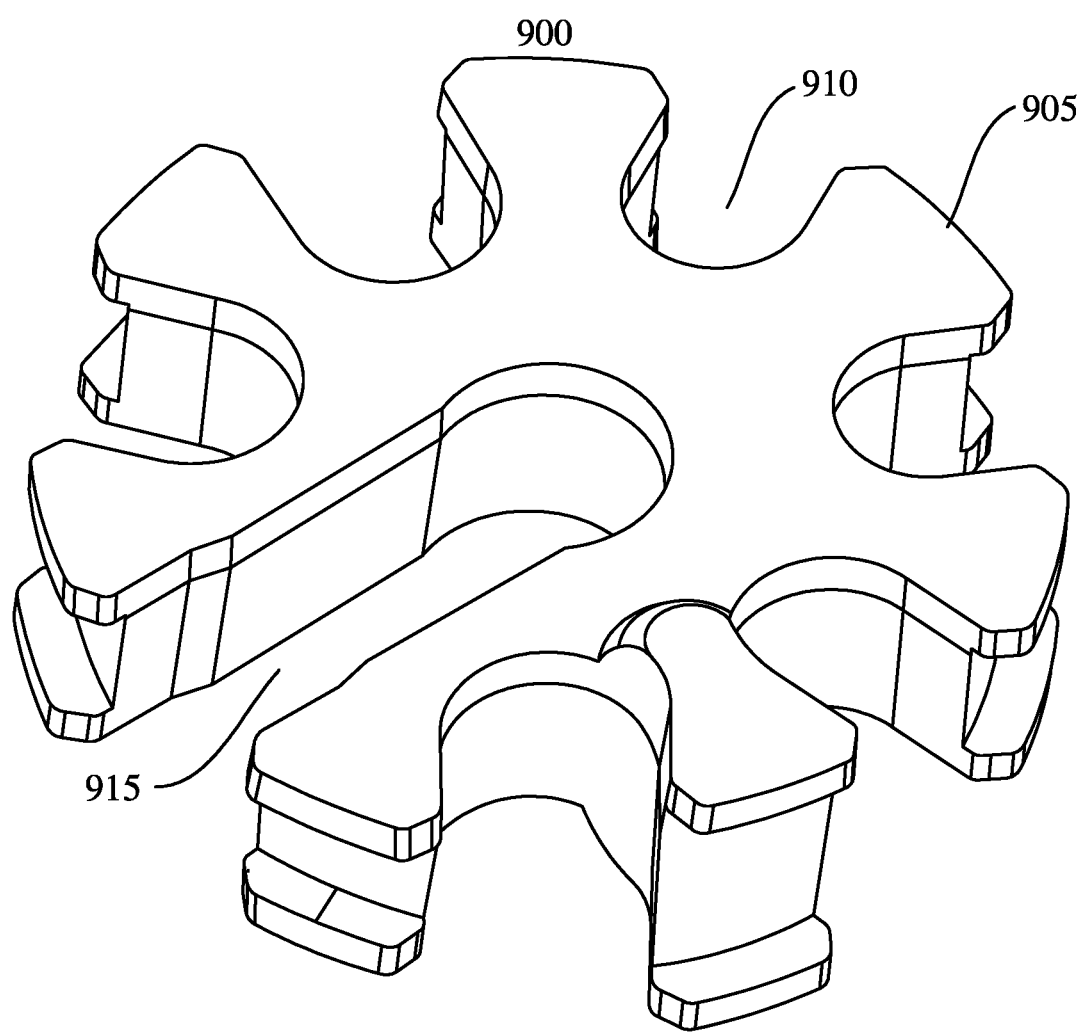
FIG. 9 illustrates a view of an example of a strain relief according to some embodiments.

FIG. 9 illustrates a strain relief component 900 configured to provide mechanical protection for at least one power cable. The strain relief component 900 may be included as a part of first end 520 and/or second end 525 to alleviate at least some or all stress on one or more at least one optical fiber cable and/or at least one power cable. For example, strain relief component 900 may comprise a plurality of fingers 905 separated by a plurality of indentations 910 partially extending from the exterior of strain relief component 900 to the center point of strain relief component 900. Additionally or alternatively, strain relief component 900 may further comprise at least one slot 915 which fully extends to the center point of strain relief component 900. In some embodiments, at least one of the plurality of indentations 910 may be configured to mechanically hold at least one power cable, and/or at least one of slot 915 may be configured to mechanically hold at least one optical fiber cable.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

PARTIAL GLOSSARY

BBU Baseband Unit
LA Length of buildup tube
LF Length of optical fiber
MC Metal clade cable
RRH Remote Radio Head TC Tray cable
TMO T-Mobile

LIST OF REFERENCE NUMBERS

100 Hybrid cable
105 DC conductors
110 Optical fiber pair
115 Fiber-breakout transition
120 Cable-breakout transition
125 Bulkhead fitting
200 Optical fiber cable assembly
205 Optical fiber cable
210 Power cable
215 Optical fiber cable
220 Power cable
225 Fiber-breakout transition
230 Cable-breakout transition
300 Fiber-breakout transition
305 First channel
310 Second channel
315 Second channel
320 Second channel
325 Optical fiber cable
330 Buildup tube
335 Buildup tube
340 Buildup tube
345 Inner cavity
350 Segment of optical fiber
355 Segment of optical fiber
360 Segment of optical fiber
365 Anti-slip fibers
370 Adhesive
500 Cable-breakout transition
505 Molded housing
510 Hybrid optical cable
515 Locking notch
520 First end of molded housing
525 Second end of molded housing
530 Channel
535 Slot
540 Lateral surface
545 Circumferential indentation
900 Strain relief component
905 Finger
910 Indentation
915 Slot

We claim:

1. An apparatus, comprising:
a fiber-breakout transition configured to break out optical fiber sets from a first end of an optical fiber cable, the fiber-breakout transition having a first channel configured to receive an end segment of the optical fiber cable, a plurality of second channels, each of the plurality of second channels is configured to receive and mechanically attach to a buildup tube for holding one or more optical fibers, and wherein the transition has an interior cavity connecting the first channel to the plurality of second channels, and wherein some of the channels have cross-sections whose diameters increase in a stepped manner with distance away from the interior cavity of the transition.

2. The apparatus of claim 1, further comprising:
a plurality of buildup tubes, wherein each of the buildup tubes comprises a segment mechanically fixed into one of the second channels; and wherein at least two of the buildup tubes have a different outer diameter.

3. The apparatus of claim 2, further comprising:
a plurality of optical fibers having segments located in one or more of the buildup tubes.

4. The apparatus of claim 3, wherein the fiber-breakout transition includes a window configured to enable external viewing of at least one portion of the interior cavity.

5. The apparatus of claim 3, wherein the plurality of optical fibers are slidably fixed inside one or more of the buildup tubes.

6. The apparatus of claim 3, further comprising:
one or more anti-sliding fibers, wherein each anti-sliding fiber comprises a segment disposed between a particular one of the buildup tubes and the particular one of the second channels in which part of the particular one of the buildup tubes is located.

7. The apparatus of claim 6, further comprising:
adhesive connecting the one or more anti-sliding fibers with at least one second channel.

8. The apparatus of claim 1, wherein the first channel comprises at least one cross-section whose diameter increases in a stepped manner with distance from the interior cavity of the transition.

9. The apparatus of claim 1, further comprising:
at least one cable housing a plurality of optical fibers, the at least one cable comprising an end segment mechanically fixed in the first channel.

10. The apparatus of claim 1, further comprising a hybrid cable, the hybrid cable comprising segments of one or more electrical conductor cables and a segment of the optical fiber cable.

11. The apparatus of claim 1, wherein the fiber-breakout transition includes a window enabling external viewing of at least a portion of the interior cavity.

12. The apparatus of claim 2, wherein the plurality of buildup tubes are furcation tubes.

13. An apparatus, comprising:
a cable-breakout transition for a hybrid optical cable having at least one optical fiber cable and at least one electrical conductor cable, the cable-breakout transition comprising:
a molded housing comprising a first end and a second end, wherein
the molded housing comprises at least one channel through the molded housing from a first end of the molded housing to a second end of the molded housing, and wherein the at least one channel is configured to mechanically hold at least one electrical conductor cable, and the molded housing comprises at least one slot along a lateral surface of the molded housing from the first end of the molded housing to the second end of the molded housing, wherein the at least one slot is configured to mechanically hold at least one optical fiber cable; and
at least one sheath disposed around the housing,
wherein the first end of the housing is configured to slide into or around an end segment of the hybrid optical cable.

14. The apparatus of claim 13, wherein the first and second ends comprise different diameters.

15. The apparatus of claim 13, further comprising a hybrid optical cable including at least one electrical conductor cable having at least one segment in the at least one of the channels, and at least one optical cable having a segment in the at least one of the slots.

16. The apparatus of claim 13, wherein the molded housing further comprises at least one circumferential indentation on a lateral surface of the molded housing.

17. The apparatus of claim 15, further comprising at least one strain relief hold, wherein the hybrid cable includes at least two electrical conductor cables having a segment in the at least one strain relief.

18. The apparatus of claim 13, wherein the molded housing comprises a cylindrical housing.

19. The apparatus of claim 13, wherein the at least one passage comprises a cylindrical passage.

\* \* \* \* \*